(12) United States Patent
Laverty

(10) Patent No.: US 7,480,566 B2
(45) Date of Patent: Jan. 20, 2009

(54) METHOD AND APPARATUS FOR NAVIGATION SYSTEM FOR SEARCHING EASILY ACCESSIBLE POI ALONG ROUTE

(75) Inventor: Tom Laverty, Los Angeles, CA (US)

(73) Assignee: Alpine Electronics, Inc., Tokyo (JP)

( * ) Notice: Subject to any disclaimer, the term of this patent is extended or adjusted under 35 U.S.C. 154(b) by 773 days.

(21) Appl. No.: 10/971,935

(22) Filed: Oct. 22, 2004

(65) Prior Publication Data

US 2006/0089788 A1 Apr. 27, 2006

(51) Int. Cl.
*G01C 21/30* (2006.01)
*G01C 21/32* (2006.01)

(52) U.S. Cl. ............... 701/209; 701/202; 701/207; 701/211; 701/213; 340/990; 340/995.19

(58) Field of Classification Search .......... 701/202, 701/209, 207, 211, 213; 340/990, 995.1; 345/418

See application file for complete search history.

(56) References Cited

U.S. PATENT DOCUMENTS

| | | | | |
|---|---|---|---|---|
| 5,369,588 | A * | 11/1994 | Hayami et al. | 340/995.19 |
| 5,557,524 | A * | 9/1996 | Maki | 701/35 |
| 5,612,881 | A * | 3/1997 | Moroto et al. | 701/209 |
| 5,977,885 | A * | 11/1999 | Watanabe | 340/995.19 |
| 6,009,403 | A | 12/1999 | Sato | |
| 6,560,530 | B1 * | 5/2003 | Yamada et al. | 701/208 |
| 6,807,482 | B2 * | 10/2004 | Utsumi | 701/209 |
| 2003/0130788 | A1 * | 7/2003 | Akashi | 701/209 |
| 2003/0154023 | A1 * | 8/2003 | Utsumi | 701/209 |

FOREIGN PATENT DOCUMENTS

| | | | |
|---|---|---|---|
| CN | 101113899 A | * | 1/2008 |
| EP | 833291 A1 | * | 4/1998 |
| EP | 1760432 A2 | * | 3/2007 |
| JP | 62261595 A | * | 11/1987 |

(Continued)

OTHER PUBLICATIONS

Reverse nearest neighbors in large graphs; Man Lung Yiu; Dimitris Papadias; Nikos Mamoulis; Yufei Tao; Knowledge and Data Engineering, IEEE Transactions on; vol. 18, Issue 4, Apr. 2006 pp. 540-553; Digital Object Identifier 10.1109/TKDE.2006.1599391.*

(Continued)

*Primary Examiner*—Cuong H Nguyen
(74) *Attorney, Agent, or Firm*—Muramatsu & Associates

(57) ABSTRACT

A search method and apparatus for a navigation system finds accessible points of interest (POI) along the route to the destination in a flexible manner. The navigation system changes its search range when the geographic condition warrants expansion of the search range. The search method is comprised of the steps of: searching POIs specified by a user along a route to a destination within a predetermined search range relative to the route, detecting POIs located within the predetermined search range, determining if a geographic condition on a specific area on the route exists that enables easy accessibility to POIs, expanding the search range if the geographic condition enabling the easy accessibility to POIs exists for the specific area, and detecting POIs located within the expanded search range.

8 Claims, 7 Drawing Sheets

FOREIGN PATENT DOCUMENTS

| | | | | |
|---|---|---|---|---|
| JP | 2005285046 | A | * | 10/2005 |
| JP | 2006325025 | A | * | 11/2006 |
| JP | 2008058031 | A | * | 3/2008 |

OTHER PUBLICATIONS

Initialisation for Visual Tracking in Urban Environments; Reitmayr, G.; Drummond, T.W.; Mixed and Augmented Reality, 2007. ISMAR 2007. 6th IEEE and ACM International Symposium on; Nov. 13-16, 2007 pp. 161-172; Digital Object Identifier 10.1109/ISMAR.2007. 4538842.*

Collaborative event detection using mobile and stationary nodes in sensor networks; Lambrou, T.P., Panayiotou, C.G.; Collaborative Computing: Networking, Applications and Worksharing, 2007. CollaborateCom 2007. International Conference on Nov. 12-15, 2007 pp. 106-115; Digital Object Identifier 10.1109/COLCOM.2007. 4553818.*

Reducing sensitivity to localization error through local search; Anderson, M.; Papanikolopoulos, N.; Intelligent Robots and Systems, 2007. IROS 2007. IEEE/RSJ International Conference on; Oct. 29, 2007-Nov. 2, 2007 pp. 1339-1342 Digital Object Identifier 10.1109/IROS.2007.4399333.*

Semantic Locations in Online Communities; Gruhn, Martin; Foll, Stefan; Pontow, Jens; Linner, David; Radusch, Ilja; Semantic Computing, 2007. ICSC 2007. International Conference on; Sep. 17-19, 2007 pp. 224-234; Digital Object Identifier 10.1109/ICSC.2007.41*

Globase.KOM—A P2P Overlay for Fully Retrievable Location-based Search; Kovalcevi, Aleksandra; Liebau, Nicolas; Steinmetz, Ralf; Peer-to-Peer Computing, 2007. P2P 2007. Seventh IEEE International Conference on; Sep. 2-5, 2007 pp. 87-96 Digital Object Identifier 10.1109/P2P.2007.18.*

The scoring procedure for a competitive research competition influences the usefulness of the results in real-world applications Thornburg, K.M.; Thomas, G.W.; Systems, Man and Cybernetics, 2007. ISIC. IEEE International Conference on; Oct. 7-10, 2007 pp. 902-907; Digital Object Identifier 10.1109/ICSMC.2007.4413918.*

A Decision-Making Framework for Control Strategies in Probabilistic Search; Chung, T.H.; Burdick, J.W.; Robotics and Automation, 2007 IEEE International Conference on; Apr. 10-14, 2007 pp. 4386-4393; Digital Object Identifier 10.1109/ROBOT.2007.364155.*

Online Route Planner for Unmanned Air Vehicle Navigation in Unknown Battlefield Environment; Changwen Zheng; Fanjiang Xu; Xiaohui Hu; Fuchun Sun; Ping Yan; Computational Engineering in Systems Applications, IMACS Multiconference on vol. 1, Oct. 4-6, 2006 pp. 814-818; Digital Object Identifier 10.1109/CESA.2006. 4281764.*

* cited by examiner

Fig. 1A

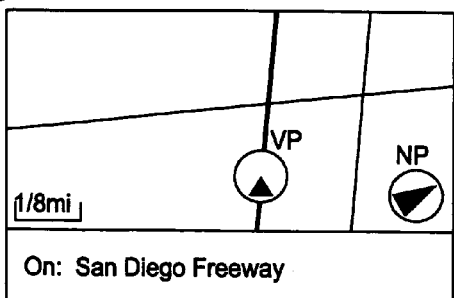

On: San Diego Freeway

Fig. 1B

| Dest | Find Destination by |
|---|---|
| | Address |
| | Intersection |
| | Point of Interest |
| | Map Cursor |
| | Recent Route |
| | Address Book |
| | Today's Plan |

Fig. 1C

| Dest | Find Point of Interest by |
|---|---|
| | Place Name |
| | Place Type |

Fig. 1D

| Dest | Select Category |
|---|---|
| | ATM |
| | BANK |
| | GAS STATION |
| | HOSPITAL |
| | MOVIE THEATER |
| | RESTAURANT |
| | VETERINARIAN |

Fig. 1E

| Dest | Select Name |
|---|---|
| Genkai 15435 Jeffrey Rd. Irvine, CA (949) 786-3420 | |
| Pizza Hut | |
| Genkai | |
| Hard Rock Cafe | |
| Sushi Boy | |

Fig. 1F

| Confirm Route |
|---|
| Genkai 15435 Jeffrey Rd. Irvine, CA (949) 786-3420 |
| By Quickest Route Method |
| OK to Proceed |
| Options |

Fig. 1G

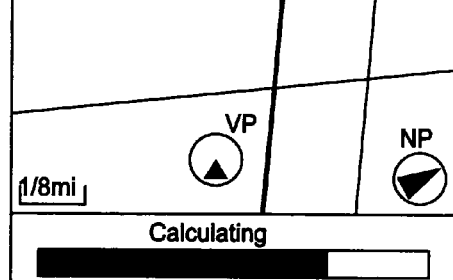

Calculating

Fig. 1H

| Next Turn: | ↰ | 1.8 mi |
|---|---|---|
| | Jeffery Rd. | |
| 1/8mi | VP | NP |
| To | 6 mi | 0:11 to go |
| On: Alton St., Irvine | | |

METHOD AND APPARATUS FOR NAVIGATION SYSTEM FOR SEARCHING EASILY ACCESSIBLE POI ALONG ROUTE

FIELD OF THE INVENTION

This invention relates to a method and apparatus for navigation system for searching easily accessible points of interest along a route, and more particularly, to a method and apparatus for navigation system that can change search criteria based on geographical conditions, thereby facilitating to search accessible points of interest.

BACKGROUND OF THE INVENTION

A navigation system performs travel guidance for enabling a user to easily and quickly reach the selected destination. A typical example is a vehicle navigation system where a user drives a car by the guidance produced by navigation system. Such a navigation system detects the position of the user or user's vehicle, reads out map data pertaining to an area at the current vehicle position from a data storage medium. Alternatively, such map data can be provided to the user from a remote server through a communication network such as Internet and the like.

When a destination is set, the navigation system starts a route guidance function for guiding a user along a calculated guided route from the start point to the destination. During the route guidance, the navigation system reads the nodes data from the data storage medium such as DVD and successively stores the nodes data of road segments constituting the guided route in a memory. In the actual traveling, the node series stored in the memory is searched for a portion of the guided route to be displayed in a map display area of the monitor screen, and the portion of the guided route is highlighted so as to be clearly discernible from other routes. When the vehicle is within a predetermined distance from an intersection it is approaching, a highlighted intersection diagram with an arrow indicating the direction to turn at the intersection is displayed to inform the user of the appropriate road and direction at the intersection.

FIGS. 1A-1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. When selecting a "Destination" menu on a main menu screen (not shown), the navigation system displays an "Find Destination By" screen as shown in FIG. 1B for specifying an input method for selecting the destination.

The "Find Destination By" screen of FIG. 1B lists various methods for selecting the destination. The methods include "Address" for specifying the city and address of the destination, "Intersection" for specifying the names of two streets which intersect with one another, and "Point of Interest" (POI) for selecting the programmed destination based on the name, category or telephone number. Other methods in the "Find Destination By" screen include "Recent Route" for specifying the destination based on the recent history of destinations saved in the system, "Address Book" for selecting the address of the destination out of the prescribed address list stored in the system, and "Today's Plan" for selecting two or more destinations.

When selecting, for example, the "Point of Interest" method, the navigation system displays selection methods of point of interest (POI) either by "Place Name" or "Place Type" in FIG. 1C. The "Place Name" is to specify a name of POI, and the "Place Type" is to specify a category of POI. If the "Place Type" is selected, the navigation system shows an "Select Category" screen such as shown in FIG. 1D.

Suppose the user selects "Restaurant", the navigation system retrieves the POIs in the selected category, restaurant, in this case, as shown in FIG. 1E. Typically, names of POIs (restaurants) will be listed in the order of distance from the user (ex. current vehicle position). If the user selects a particular restaurant from the list, the navigation system displays a "Confirm Route" screen such as shown in FIG. 1F. In this example, the "Confirm Route" screen lists the name, address and phone number of the destination (POI specified by the user). If this is the correct destination, the user enters an "Ok to Proceed" key to proceed to the next procedure.

In FIG. 1G, the navigation system calculates and determines a route to the destination, i.e., the selected POI. The navigation system determines a route to the destination based on, for example, the shortest way to reach the destination, the route using many free ways as possible or the route without using toll road, and the like. Then, the navigation system starts the route guidance as shown in FIG. 1H to guide the user along the calculated route to the destination. Typically, the navigation system shows the intersection which is highlighted to show the next turn and a direction of the turn. Such route guidance by the navigation system is also accompanied by voice instructions.

The foregoing is a typical example of using the "Point of Interest (POI)" input method of the navigation system. Because the recent storage medium provides a large volume of POI data, this input method can be used in various applications. For example, suppose a user is driving a car for a relatively long trip and the final destination is already specified, i.e., a calculated route to the destination is established. During the trip to the destination, the user wants to stop-by various places such as a gas station, restaurant, shopping mall, etc., along the calculated route. Alternatively, the user may simply want to enjoy seeing various places surrounding the calculated route to the destination by retrieving POIs along the route.

Such a situation is shown in FIG. 2A. As the vehicle indicated by VP moves to the destination ("Dest"), the user may want to stop by at a restaurant. Several restaurants exist along the guided route to the destination. Some restaurants are located close to the guided (calculated) route while others require a detour. Thus, it is helpful for the user if the navigation system provides information whether such POIs are easily accessible.

When searching POIs along the calculated route, the navigation system searches for POIs within a predetermined distance from the calculated route. FIG. 2B is a schematic diagram showing such a method of detecting POIs along the route to the destination. POIs 75a-75f of selected category are located along the route. A reference numeral 111 indicates the current position of the vehicle. A reference numeral 101 indicates the route to the destination calculated by the navigation system.

In this example, the navigation system creates a search range 113 which is formed, for example, by moving a search circle 135 on the calculated route 101. The navigation system will repeatedly check if POIs exist within the search range 113 by moving the search circle 135 on the calculated route and retrieves POIs within the search range 113. The outer edges of the search range 113 are denoted by lines 65a and 65b each of which has a distance Dt, for example, 0.3 miles, from the calculated route 101.

If POIs fall within the predetermined search range 113, the navigation system regards those POIs as accessible POIs and displays the information on the POIs. On the other hand, for POIs which do not fall within the predetermined range 113, the navigation system regards those POIs as non-accessible POIs and will not display the POIs. In this example, POIs 75a, 75c, 75e, and 75f are located within the search range 113, and thus retrieved by the navigation system. POIs 75b, 75d, 75g, and 75h are outside of the search range 113, and thus, not retrieved by the navigation system because they are not easily accessible.

FIG. 3 shows an example of method for searching POIs along the route as applied to an actual situation. The navigation system checks if the POIs exist within the search range 113 along the calculated route 101. As noted above, the search range 113 is created by incrementally shifting the search circle 135 on the calculated route 101. Among several POIs 123a-123e, the navigation system will retrieve only POI 123b as it falls within the search range 113.

When using the function of searching POIs along the route, the user is primarily interested in knowing about accessibility to the POIs, rather than mere distance from the calculated route. For example, there arises a case in which the geographical conditions allow the user to easily access a particular POI, even though its location is outside of the predetermined search range. Typically, when a POI is located on a street intersecting with the calculated route 101, the user can easily maneuver to the POI. In FIG. 3, the user can easily reach the POI 123a by making a left turn at a cross street 105a although the POI 123a is outside of the search range 113. Likewise, the user can easily access the POI 123d by making a right turn at the cross street 105b.

Thus, there is a need of a new function of a navigation system for searching POIs along the calculated route based on accessibility to the POIs.

SUMMARY OF THE INVENTION

It is, therefore, an object of the present invention to provide a search method that can identify and retrieve easily accessible points of interest (POIs) along the calculated route to the destination.

It is another object of the present invention to provide a navigation system that can vary its search range when it determines that the geographic condition warrants expansion of the search range when searching POIs along the calculated route to the destination.

It is a further object of the present invention to provide a POI search method for searching POIs along the calculated route to the destination which is capable of expanding search range by searching POIs along a street crossing with the calculated route to the destination.

One aspect of the preset invention is a POI search method for a navigation system for identifying and retrieving easily accessible POIs along the calculated route to the destination. The search method is comprised of the steps of: searching points of interest specified by a user along a route to a destination within a predetermined search range relative to the route, detecting points of interest located within the predetermined search range, determining if a geographic condition on a specific area on the route exists that enables easy accessibility to points of interest, expanding the search range if the geographic condition enabling the easy accessibility to points of interest exists for the specific area, and detecting points of interest located within the expanded search range.

In one example, the geographic condition is an intersection where the route to the destination intersects with a cross street. In another example, the geographic condition is a freeway exit where the route to the destination includes a freeway.

The predetermined search range is created by shifting a search circle on the route to the destination. The expanded search range has a circular shape that encompasses the specific area. Alternatively, the expanded search range has a belt like shape that encompasses the specific area.

In the present invention, the geographic condition is an intersection where the route to the destination intersects with a cross street, and where the expanded search range having a circular shape is applied to the intersection. The geographic condition is an intersection where the route to the destination intersects with a cross street, and where the expanded search range having a belt like shape is applied to the intersection along both directions of the cross street by shifting a search circle.

Another aspect of the present invention is a POI search apparatus for a navigation system for implementing the various steps defined in the search method of the present invention noted above. The search apparatus detects the POIs along the route to the destination where a search range is expanded at a specific area such as an intersection.

According to the present invention, the navigation system changes its search range when it determines that the geographic condition warrants expansion of the search range when searching points of interest (POIs) along the calculated route to the destination. An example of such geographic conditions is an intersection where the search range is expanded to search POIs along a street that intersects with the calculated route to the destination. Therefore, the navigation system of the present invention is able to identify and retrieve easily accessible POIs along the calculated route to the destination with high flexibility and high speed.

BRIEF DESCRIPTION OF THE DRAWINGS

FIGS. 1A-1H are schematic diagrams showing an example of operational process and screen display of a navigation system for implementing the method and apparatus of the present invention.

DETAILED DESCRIPTION OF THE INVENTION

The present invention will be described in detail with reference to the accompanying drawings. The navigation system of the present invention is designed to find accessible points of interest (POI) along the route to the destination. When the user specifies a function for retrieving POIs along the calculated (guided) route to the destination, the navigation system will detects POIs within a predetermined range from the calculated route. When the navigation system determines that there is a geographical condition on the calculated route that allow easy accessibility to POIs, the navigation system will increase the search range.

Figure 4:
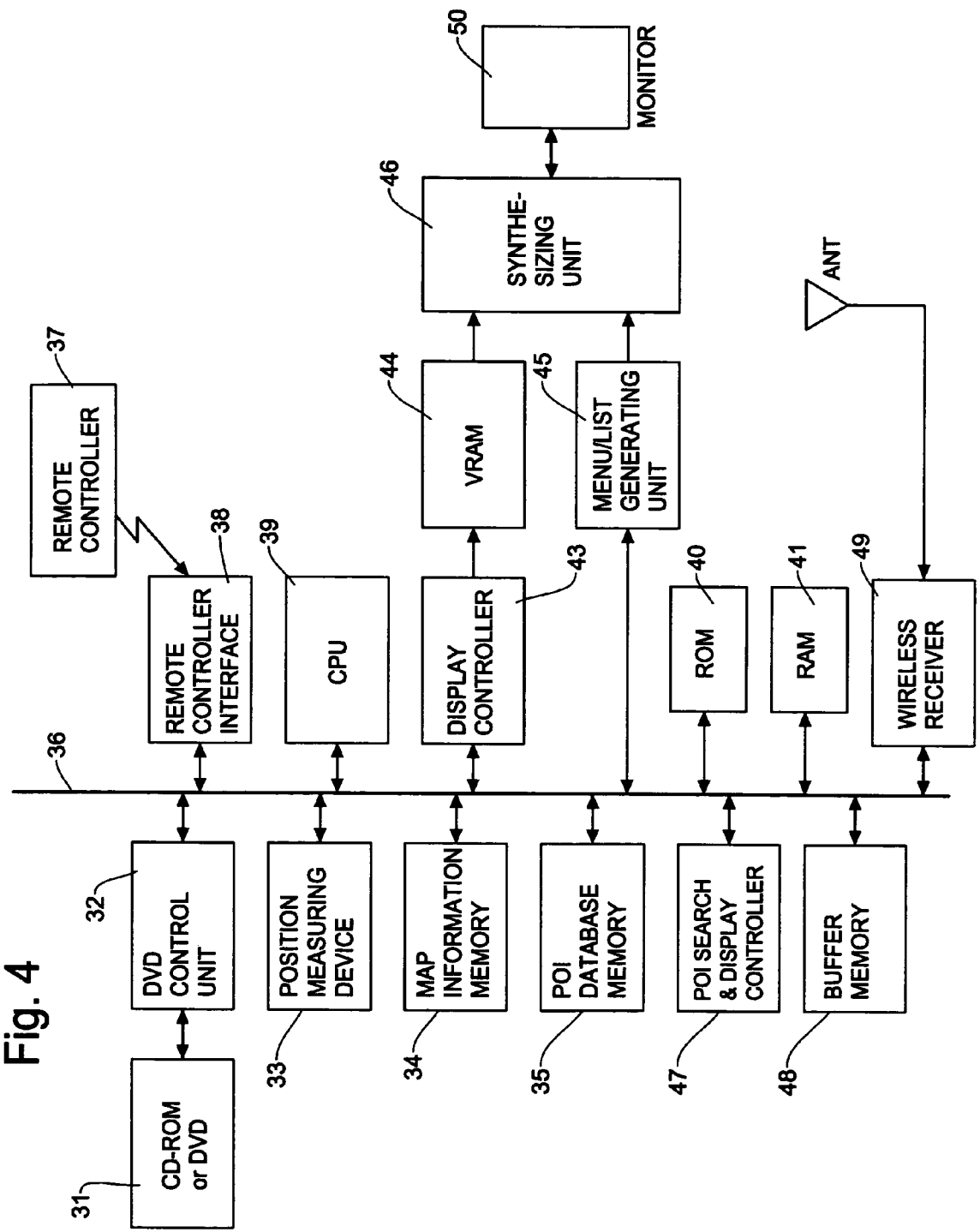
FIG. 4 is a block diagram showing an example of structure of a vehicle navigation system which is suitable for implementing the present invention for searching accessible POIs along the route to the destination.

FIG. 4 shows an example of structure of a vehicle navigation system implementing the present invention. It should be noted that the present invention can also be applied to portable navigation devices such as a PDA (personal digital assistant) device, a lap-top computer, or other hand-held devices.

In the block diagram of FIG. 4, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 4 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc., and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guided (calculated) route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a POI search and display controller 47, a buffer memory 48, a wireless receiver 49, and a monitor (display) 50.

A POI search and display controller 47 directly relates to the present invention. The POI search and display controller 47 has a function of controlling an overall procedure for searching POIs along the guided route to the destination. Upon examining the geographic conditions, the POI search and display controller 47 freely changes the search range so that the navigation system can identify and retrieve accessible points of interest.

Figure 5:
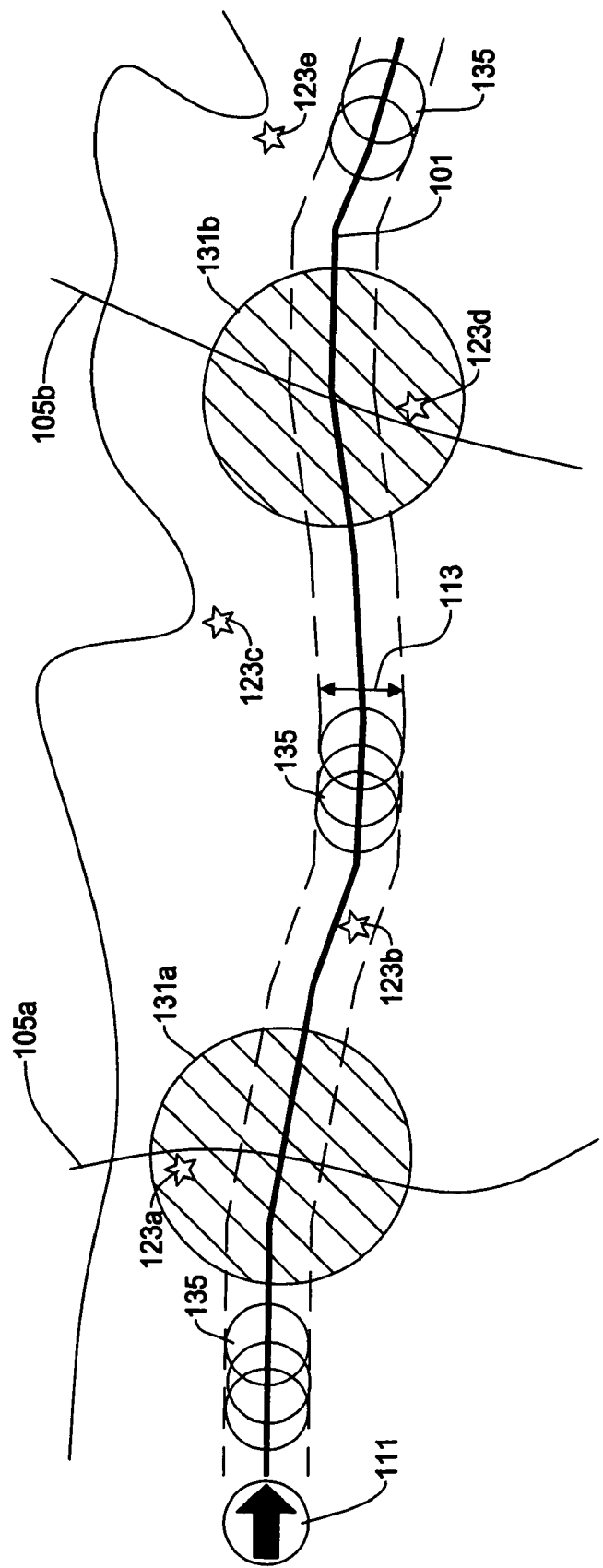
FIG. 5 is a schematic view showing the method of a first embodiment of the present invention for finding accessible points of interest along the calculated route to the destination.

The details of the method for identifying accessible POIs are explained with reference to FIGS. 5 and 6. FIG. 5 is a schematic view showing a method for searching accessible POIs along the calculated route in the first embodiment of the present invention. The user sets the destination by, for example, using the procedure described in FIG. 1A-1H. The vehicle (user) 111 moves along the calculated route 101 in the direction shown by its arrow. Suppose the user selects the function for searching POIs along the route. Typically, as shown in FIGS. 1C and 1D, the user also specifies a specific category of POIs such as grocery store, shopping mall, restaurant, etc., that he wants to search.

Figure 2A:
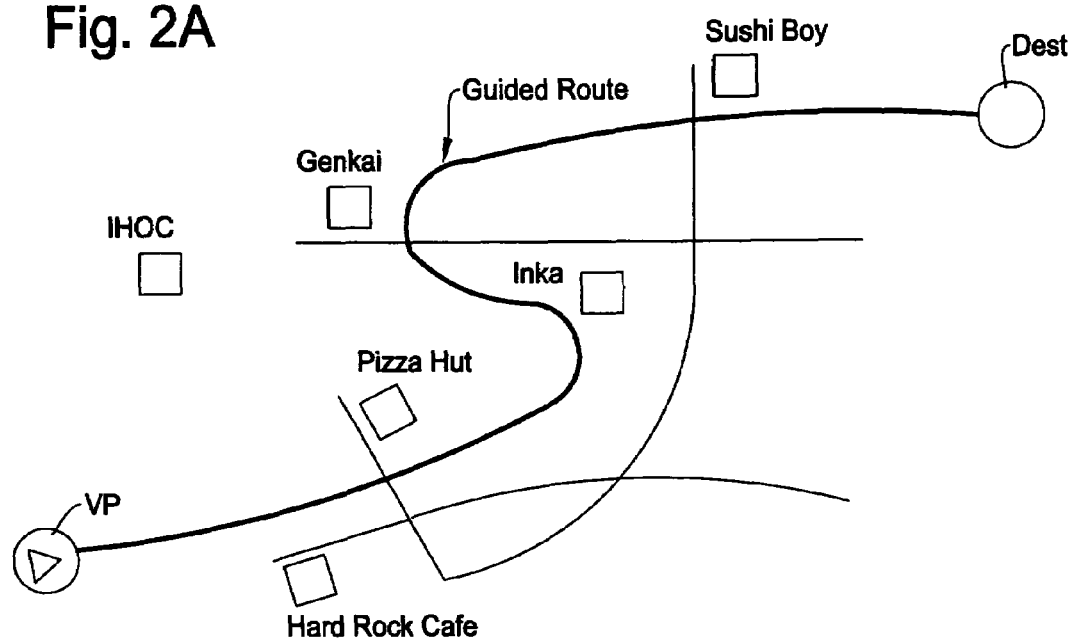
FIG. 2A is a schematic diagram showing an example of a situation where several points of interest are located along a calculated route to a destination.
Figure 2B:
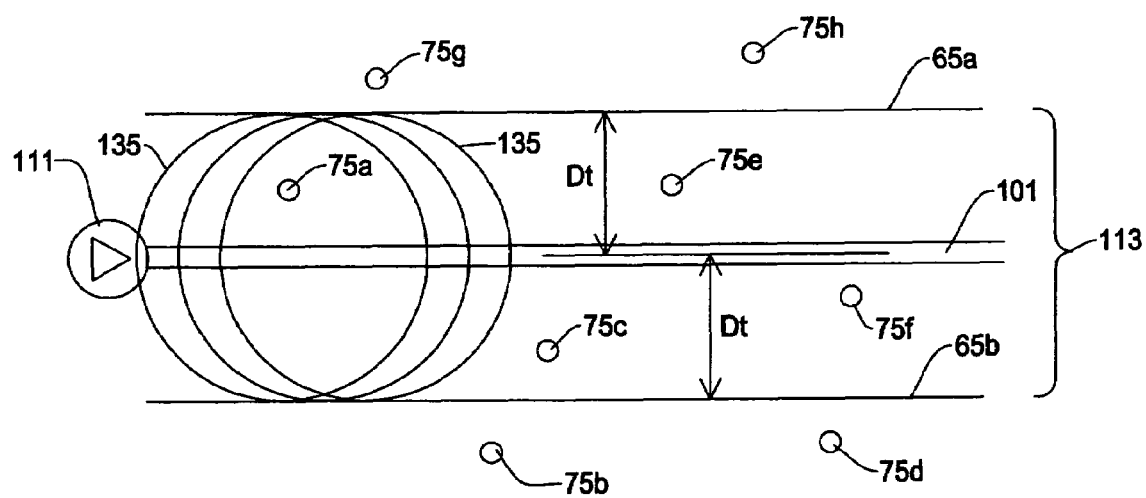
FIG. 2B is a schematic view showing an example of conventional method for finding points of interest along a calculated route.

The navigation system normally searches relevant POIs by repeatedly checking whether POIs exist along the calculated route to the destination within a search range. A search range is predetermined in a manner that the search range encompass both sides of the calculated route to the destination. In this preferred embodiment, the navigation system will check whether a POI exists within the search range 113 defined by search circles 135 described with reference to FIG. 2B.

As the search circle continuously shifts on the route 101 to the direction of the destination, the search range 113 is formed by the outer periphery of the search circles 135. In FIGS. 5 and 6, the search range 113 is indicated by broken lines. Namely, the broken lines show the width of the search range 113, i.e., a diameter of the search circle 135, which is for example, 0.4-1.0 mile. Thus, the navigation system in effect determines if a POI is located within the search range 113 along the route 101.

When the navigation system determines that the vehicle will enter into such a geographical area that allows a user to easily reach a POI even though such a POI is outside of the current search range 113. If such a condition is found, the navigation system will expand the search range on such a specific area on the route. Such a case occurs when the calculated route 101 intersects with a street such as a cross street 105a. In FIG. 5, although outside of the search range 113, there is a POI 123a located along the cross street 105a. When the vehicle approaches the intersection formed by the calculated route 101 and the cross street 105a, the user can easily access to the POI 123a since the user only needs to make a left turn at the intersection and advances on the cross street 105a for a short distance.

A similar situation occurs when the vehicle approaches the intersection formed by the calculated route 101 and the cross street 105b. In this case, the user can easily access to a POI 123d since the user only needs to make a right turn at the cross street 105b and drives on the cross street 105b by a short distance. Even though the user has to depart from the calculated route 101 greater than the search range 113, since the POIs 123a and 123d are located along the cross streets 105a and 105b, respectively, it is not a burden for the user to reach the POI 123a or 123d. In other words, the POIs 123a and 123d are easily accessible.

Figure 3:
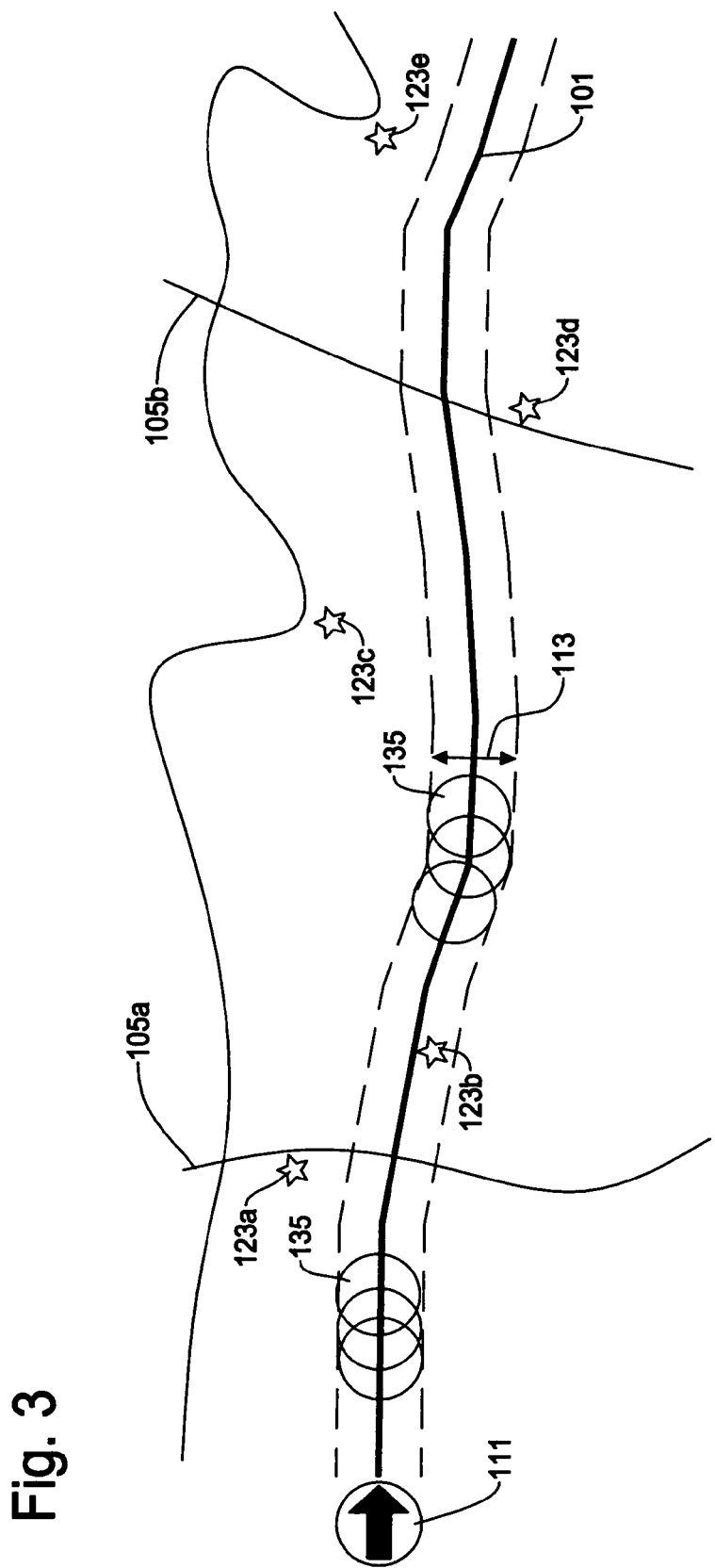
FIG. 3 is a schematic view showing an example of a situation where several points of interest are located around a calculated route and the conventional method of FIG. 2B is applied thereto for finding points of interest along the calculated route.

In the conventional navigation system shown in FIG. 3, the POI 123a and POI 123d are not detected as POIs along the route because the navigation system only detects POIs located within the search range 113. In the present invention, as shown in FIG. 5, in order to detect the accessible POIs with higher flexibility, the navigation system will expand the search range at a specific area, for example, an intersection. The expanded search ranges 131a and 131b are shaded to show the covered areas. As shown, due to its increased size, the expanded search ranges (circles) 131a and 131b now cover the POI 123a and 123d, respectively. The navigation system therefore retrieves the POIs 123a and 123d and displays the information on the POIs 123a and 123d.

As noted above, the navigation system extends the scope of search only for a specific area, where there is a geographical condition that facilitates easy accessibility to POIs, such as an intersection. Thus, the navigation system will not detect the POI 123c because it is not easily accessible from the calculated route 101 to the destination. If the initial search range 113 is as large as the expanded search range 131 throughout the calculated route 101, the navigation system would detect POI 123*c* and POI 123*e* as POIs along the route. However, this will mislead the user because, in order to reach POI 123*c* or 123*e*, the user will have to take a roundabout route to reach there.

Further, if the large search range 131 is used throughout the process, the navigation system needs a long time to detect the POIs because of the increase of the area to be searched or the navigation system has to use a high speed processor which increases the cost. In the present invention, because the search range expands only at intersections, the navigation system can avoid such problems. Thus, the POIs 123*c* and 123*e* are not detected as POIs along the route, thereby maintaining reliability of POI detection.

Although the present invention is described for the case where the navigation system expands the search range at an intersection in the above-described embodiment example, the application of expanding the search range is not limited to an intersection. For instance, when the route to the destination includes a freeway, and if a POI is located close to a freeway exit but not within a predetermined search range from the freeway, the present invention can be advantageously implemented to identify such a POI by enlarging the search range at the freeway exits. Moreover, although only one cross street intersects the calculated route in the above example, the navigation system of the present invention is applicable even when the two or more cross streets intersect with the calculated route. Further, it is possible that the navigation system will increase the search range in a country area than that in the downtown area.

Figure 6:
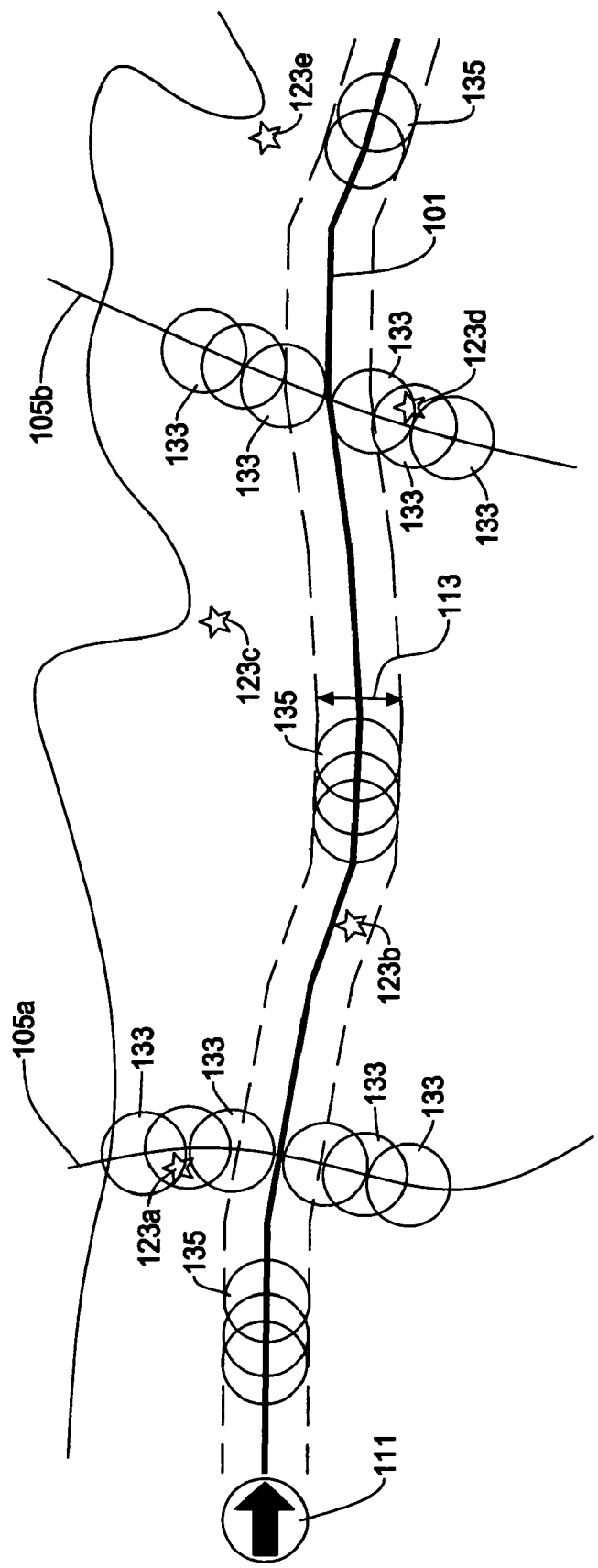
FIG. 6 is a schematic view showing the method of a second embodiment of the present invention for finding accessible points of interest along the calculated route to the destination.

FIG. 6 is a schematic diagram showing a second embodiment of the present invention for searching accessible POIs along the calculated route to the destination. This example is similar to that of FIG. 5 except for the method of increasing the search ranges at a specific area, for example, an intersection. In this embodiment, the navigation system maintains the similar or same search range but extends the search range in both directions of the cross street for a predetermined distance. Thus, the area for the expanded search has a belt like shape formed by traces of the search circle shifting along the cross street.

When the navigation system detects that there is an intersection formed by the calculated route 101 and a cross street 105*a*, the navigation system will move the search circle 133 along the cross street 105*a*. Thus, the search area is expanded toward both north and south directions (upper and lower directions of FIG. 6) on the cross street 105*a* by a predetermined distance to search POIs. In other words, the navigation system will search the POIs not only along the calculated route 101 to the destination but also along the cross street 105*a*.

The search operation along the cross street 105*a* is conducted in a manner similar to the ordinary POI search along the route method. That is, the navigation system will repeatedly check if any POI is located within a search range created by the search circles 133. The detection operation is repeated by shifting the search circle 133 for a predetermined distance on the cross street 105*a*. Such a predetermined distance should be short enough to maintain the easy accessibility to the detected POIs while long enough to expand the search range substantially larger than the search range 113 on the calculated route 101.

Since the POI 123*a* is located within the extended search area, the navigation system will determine that the POI 123*a* is an accessible POI and retrieve the information on the POI 123*a* to display on the monitor. Likewise, the navigation system will find the POI 123*d* by extending the search direction on the cross street 105*b* at the intersection formed by the calculated route 101 and the cross street 105*b*. Because the navigation system extends the search only for a certain geographical condition, such as an intersection in this example, it can accurately detect accessible POIs along the route while avoiding detection of POIs that are not easily accessible. Further, since the search range is expanded only for a certain condition, the search process can be completed within a short period of time without using an expensive high performance processor.

Figure 7:
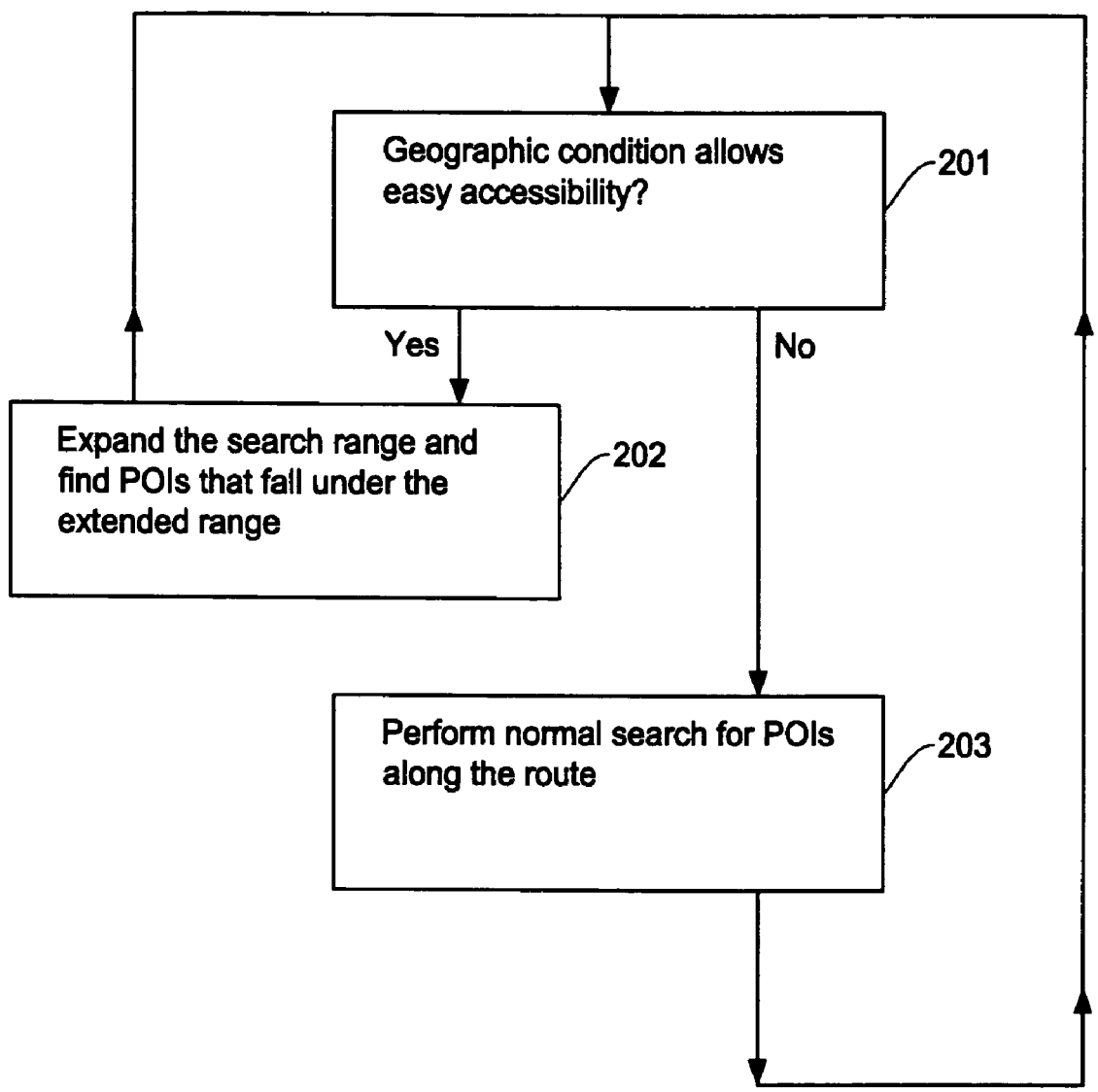
FIG. 7 is a flow chart showing an overall procedure for identifying accessible POIs along the route in the present invention.

FIG. 7 is a flow chart showing an example of overall procedure of the present invention for identifying accessible POIs along the calculated route to the destination. At step 201, the navigation system determines if the user will encounter a geographic area that allows easy accessibility to POIs, such as an intersection. If so, the navigation system performs an expanded search in step 202 as described with reference to FIGS. 5 and 6. After the extended search is completed, the navigation system will return to the normal search. On the other hand, if the navigation system determines that the user will not encounter a geographic area allowing easy accessibility, it will perform a normal search within the predetermined search range in step 203. The procedure is repeated until the navigation system finds all POIs that are easily accessible along the route. The search may be conducted in real time as the vehicle moves along the calculated route, or it may be performed without regard to an actual current vehicle position.

In the flow chart of FIG. 7, the navigation system checks if geographic condition, such as an intersection, that allows easy accessibility to POIs exists, and if such a condition does exist, the navigation system will apply the expanded search range. However, it should be noted that the present invention need not strictly follow this procedure, and procedural variations are also possible. For example, the navigation system may perform the normal search operation for POIs along the route without checking the geographic conditions, and then determine if intersections exist for applying expanded search. In effect, this procedural arrangement first makes a sweeping search for the route, then makes a fine-tuned search for some geographic conditions such as intersections.

Thus, the navigation system of the present invention can find easily accessible POIs along the route more accurately than conventional navigation systems. Consequently, the navigation system is able to retrieve and display information on the accessible POIs along the route to the destination to help the user to effectively use the navigation system.

As has been described above, according to the present invention, the navigation system changes its search range when it determines that the geographic condition warrants expansion of the search range when searching points of interest (POIs) along the calculated route to the destination. An example of such geographic conditions is an intersection where the search range is expanded to search POIs along a street that intersects with the calculated route to the destination. Therefore, the navigation system of the present invention is able to identify and retrieve easily accessible POIs along the calculated route to the destination with high flexibility and high speed.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A method for a navigation system for identifying and retrieving information on points of interest along a route, comprising the following steps of:
searching points of interest specified by a user along a route to a destination within a predetermined search range relative to the route;
detecting points of interest located within the predetermined search range;
determining if a geographic condition on a specific area on the route exists that enables easy accessibility to points of interest even though such points of interest are located outside of the predetermined search range;
expanding the search range if the geographic condition enabling the easy accessibility to points of interest exists for the specific area; and
detecting points of interest located within the expanded search range.

2. A method as defined in claim 1, wherein said geographic condition is an intersection where the route to the destination intersects with a cross street, thereby expanding the search range on the intersection.

3. A method as defined in claim 1, wherein said geographic condition is a freeway exit where the route to the destination includes a freeway, thereby expanding the search range on the freeway exit.

4. A method as defined in claim 1, wherein said expanded search range has a circular shape that encompasses the specific area where a diameter of the circular shape is larger than the predetermined search range.

5. A method as defined in claim 1, wherein said expanded search range has a belt like shape that encompasses the specific area where a distance of the belt like shape is larger than the predetermined search range.

6. A method as defined in claim 1, wherein said predetermined search range is created by shifting a search circle on the route to the destination.

7. A method as defined in claim 1, wherein said geographic condition is an intersection where the route to the destination intersects with a cross street, thereby expanding the search range on the intersection, and where said expanded search range having a circular shape is applied to the intersection.

8. A method as defined in claim 1, wherein said geographic condition is an intersection where the route to the destination intersects with a cross street, thereby expanding the search range on the intersection, and where said expanded search range having a belt like shape is applied to the intersection along both directions of the cross street by shifting a search circle.

* * * * *